United States Patent [19]
Madet

[11] 3,889,902
[45] June 17, 1975

[54] HELICOPTER COMPRISING A PLURALITY OF LIFTING ROTORS AND AT LEAST ONE PROPELLING UNIT

[76] Inventor: Francois Madet, 44 rue Guillaume du vair, 94290-Villeneuve le Roi, France

[22] Filed: Dec. 26, 1973

[21] Appl. No.: 427,632

[30] Foreign Application Priority Data
Dec. 26, 1972 France .................... 72.46176

[52] U.S. Cl. .............. 244/17.23; 244/23 B; 244/52
[51] Int. Cl. .................................... B64c 27/08
[58] Field of Search........ 244/17.23, 17.11, 6, 12 R, 244/12 B, 23 R, 23 B, 51, 52, 139

[56] References Cited
UNITED STATES PATENTS

| | | | |
|---|---|---|---|
| 984,269 | 2/1911 | Friedel | 244/12 B X |
| 2,657,880 | 11/1953 | Bannister | 244/139 X |
| 2,966,318 | 12/1960 | Chodan | 244/51 X |
| 3,002,712 | 10/1961 | Beckwith | 244/17.23 |
| 3,154,917 | 11/1964 | Williamson | 244/23 B X |
| 3,280,560 | 10/1966 | Marchant et al. | 244/52 X |
| 3,388,878 | 6/1968 | Peterson et al. | 244/12 B X |
| 3,395,881 | 8/1968 | Markham et al. | 244/139 |
| 3,438,581 | 4/1969 | Smith | 244/52 X |
| 3,783,618 | 1/1974 | Kawamura | 244/23 B X |

FOREIGN PATENTS OR APPLICATIONS
935,884 9/1963 United Kingdom............... 244/23 R

*Primary Examiner*—Trygve M. Blix
*Assistant Examiner*—Barry L. Kelmachter
*Attorney, Agent, or Firm*—Gottlieb, Rackman, Reisman & Kirsch

[57] ABSTRACT

A multi-rotor helicopter comprising a polygonal platform having mounted symmetrically along its outer periphery a number $2n$ of short-bladed lifting rotors. These rotors are adapted either to be driven by pairs in opposite directions by a same number $2n$ of gas turbines, specially for vertical landing and take-off, or to rotate freely (windmilling) when the aircraft is propelled horizontally by a jet engine, also mounted on the platform. This platform also supports a cockpit or crew cabin.

9 Claims, 10 Drawing Figures

HELICOPTER COMPRISING A PLURALITY OF LIFTING ROTORS AND AT LEAST ONE PROPELLING UNIT

BACKGROUND OF THE INVENTION

This invention relates to an aircraft comprising at least one propulsion power unit for horizontal or level flight and a plurality of lifting rotors.

For various technical reasons, autogyros (obsolete aircrafts comprising each a propulsion power unit and one freely-rotating rotor) have been gradually abandoned to the benefit of helicopters, which differ from autogyros mainly in that they do not comprise any propulsion power unit for level flight, and their rotor is constantly drivingly connected to an engine. However, helicopters are objectionable not ony on account of their relatively low level-flight speeds but also on account of various other technical inconveniences : the helicopters which have their rotor positively coupled to the engine generally comprise complicated, expensive and heavy transmission and reduction mechanisms, requiring frequent supervisions and overhauls. The helicopters which have their rotor blades driven by gas jets ejected from the blade tips, said gas jets being produced either directly from a jet engine or from a compressor driven by any suitable engine, such as a jet engine, are free of the above-mentioned drawbacks but their efficiency is considerably lower, about one-half that of helicopters comprising a direct transmission mechanism.

SUMMARY OF THE INVENTION

A primary object of this invention is to provide an aircraft comprising at least one propulsion power unit for level flight and a plurality of lifting rotors, said aircraft being free of the inconveniences both of autogyros and of hitherto known types of helicopters as mentioned hereinabove.

A further object of this invention is to provide an aircraft of the type set forth, which is capable of flying horizontally at relatively very high speeds, notably higher than those of helicopters, said aircraft being also capable of vertically taking off and landing, and also of hovering like helicopters.

A prior attempt was made with these objects in view; it consisted in housing in the wings of an aircraft comprising two propulsion jet engines for producing the level-flight thrust, a pair of lifting rotors, which were used only for vertical manoeuvres; thus, for example, when vertically taking off and landing, the gases generated by the jet engines were deflected towards the blades of a pair of turbines mounted at the outer periphery of the two lifting rotors; nevertheless, under level flight conditions the necessary lift was provided only by the aircraft wings.

An aircraft was also previously built with a fuselage comprising a propulsion power unit for horizontal or level flitht and a single lifting rotor of relatively great diameter, said rotor being adapted to be controlled either for windmilling (i.e. free or auto-rotation), specially in level flight, or for direct coupling to an engine, specially for taking off and landing, so that these last-mentioned manoeuvres took place substantially vertically.

Another object of this invention is to provide an aircraft comprising a platform having at least one symmetry axis, a propulsion jet engine for level flight, disposed along the symmetry axis of said platform, and a number $n$ of pairs of short bladed lifting rotors, the two rotors of each pair rotating in opposite directions and being disposed symmetrically in relation to the axis of said platform.

With this arrangement, the aircraft according to the present invention can take off vertically, then start an accelerated level flight, like a helicopter; however, even before attaining the maximum level speed that can be impressed thereto by its lifting rotors coupled to their engines, the aircraft according to this invention can be powerfully accelerated by means of its level-flight jet engine, and then, when the aircraft level-flying speed has attained a sufficient value, the lifting rotors can be disconnected from the engines and allowed to rotate freely or windmilling like the rotor of an autogyro; however, it is preferable to maintain said rotors coupled to their respective engines, as will be explained hereinafter.

A further object of this invention is to provide an aircraft which, by virtue of its capacity of moving very rapidly in the three space dimension, is specially adapted for military purposes, such as observation, attack and defense, and also for various civil purposes, in the field of rapid transportation, specially sanitary transport, civil protection, agricultural applications, etc...

In a preferred embodiment of the aircraft according to this invention, the aforesaid platform, when seen in plane view, has a circular or polygonal configuration, specially a polygonal shape with $2n$ sides of same size, the $2n$ lifting rotors have a diameter substantially smaller than that of said platform and they are mounted along the outer periphery of said platform with $180°/n$ relative angular shiftings; a propulsion jet engine producing a substantially horizontal thrust is also mounted on said platform with its axis coincident with a predetermined diameter of said platform. This symmetrical disposal of the rotors along the periphery of said platform, whether circular or polygonal, results in the aircraft having not only a perfect stability, even under very severe weather conditions, but also a high flying reliability, due notably to the fact that, with a relatively high number $2n$ of lifting rotors, the jamming or failure of one of them will reduce only very moderaltely the aircraft lift; even if two rotors rotating in opposite directions fail to operate, the residual lift of the aircraft is still sufficient to enable the pilot to land the aircraft on an emergency ground.

In the above-mentioned preferred embodiment of this invention, the aircraft possibly further comprises $2n$ gas trubines mounted adjacent the outer periphery of the platform and having their rotors coupled to said $2n$ lifting rotors, means for producing propulsion gases and other means for controllably distributing said propulsion gases to said turbines. It will thus be seen that this aircraft, being free of any mechanical transmission or reduction gearing, is of particularly simple design and particularly advantageous in comparision with helicopters comprising mechanical transmission means, from the points of view of weight, manufacturing cost and maintenance cost; in addition, compared with conventional helicopters, the aircraft according to this invention is advantageous in that it does not require an additional power consumption for compensating the reaction of the driving torque transmitted to the rotor.

As it comprises lifting rotors of relatively small diameter, substantially smaller than the diameter of its platform, and consequently having short and massive blades, capable of withstanding high stress values, the aircraft according to this invention, when propelled by its level-flight power unit, can fly at level speeds very much higher than those reasonably supported by the large-diameter rotors of conventional helicopters and other aircrafts previously mentioned.

The aforesaid preferred embodiment of the aircraft according to this invention possibly comprises a gas distributing box having an inlet connected to the jet engine, a first outlet connected to the propulsion nozzle, and other outlets connected to the rotor-driving turbines, respectively, each of the outlets of said gas distributing box being provided with gas output control means. This gas distributing box may also be supplied with gas from at least one of a pair of separate jet engines, preferably of same size and characteristics. Auxiliary or emergency thrust gas generators, such as rockets, may be also disposed with a view to supply gas to said distributing box in case of failure of the propulsion jet engine. At least one cockpit or crew cabin may be mounted on the top and/or the bottom face of said platform. A three-wheeled undercarriage, preferably of the 'stilt' type, with a wheelbase greater than the width or diameter of the platform, may be mounted to the lower portion of this platform, so that the steerable wheel thereof be plumb to the symmetry axis of the platform, preferably below the propulsion jet engine.

A typical embodiment of the aircraft according to this invention will now be described with reference to the accompanying diagrammatic drawings.

DESCRIPTION OF THE PREFERRED EMBODIMENT

Figure 1:
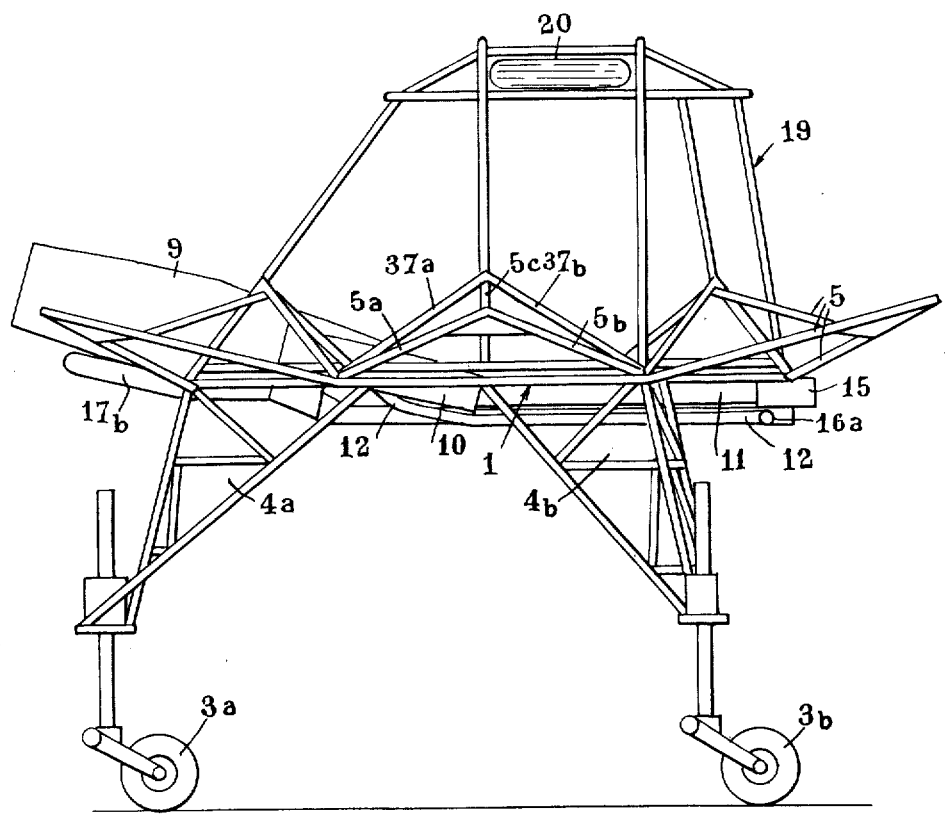
FIG. 1, 2 and 3 illustrate this embodiment in side elevational, front elevational and plane views, respectively.
Figure 2:
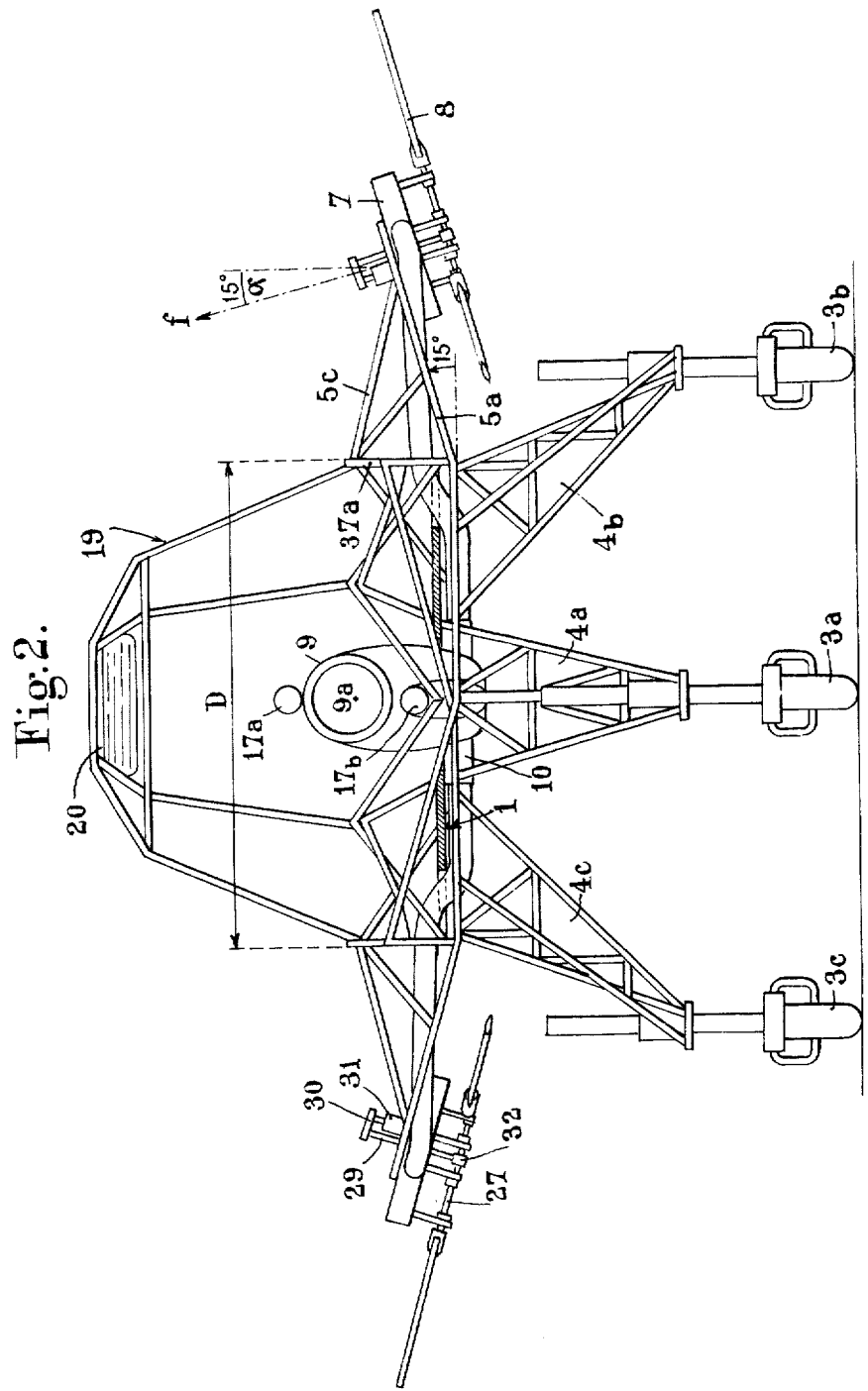
Figure 3:
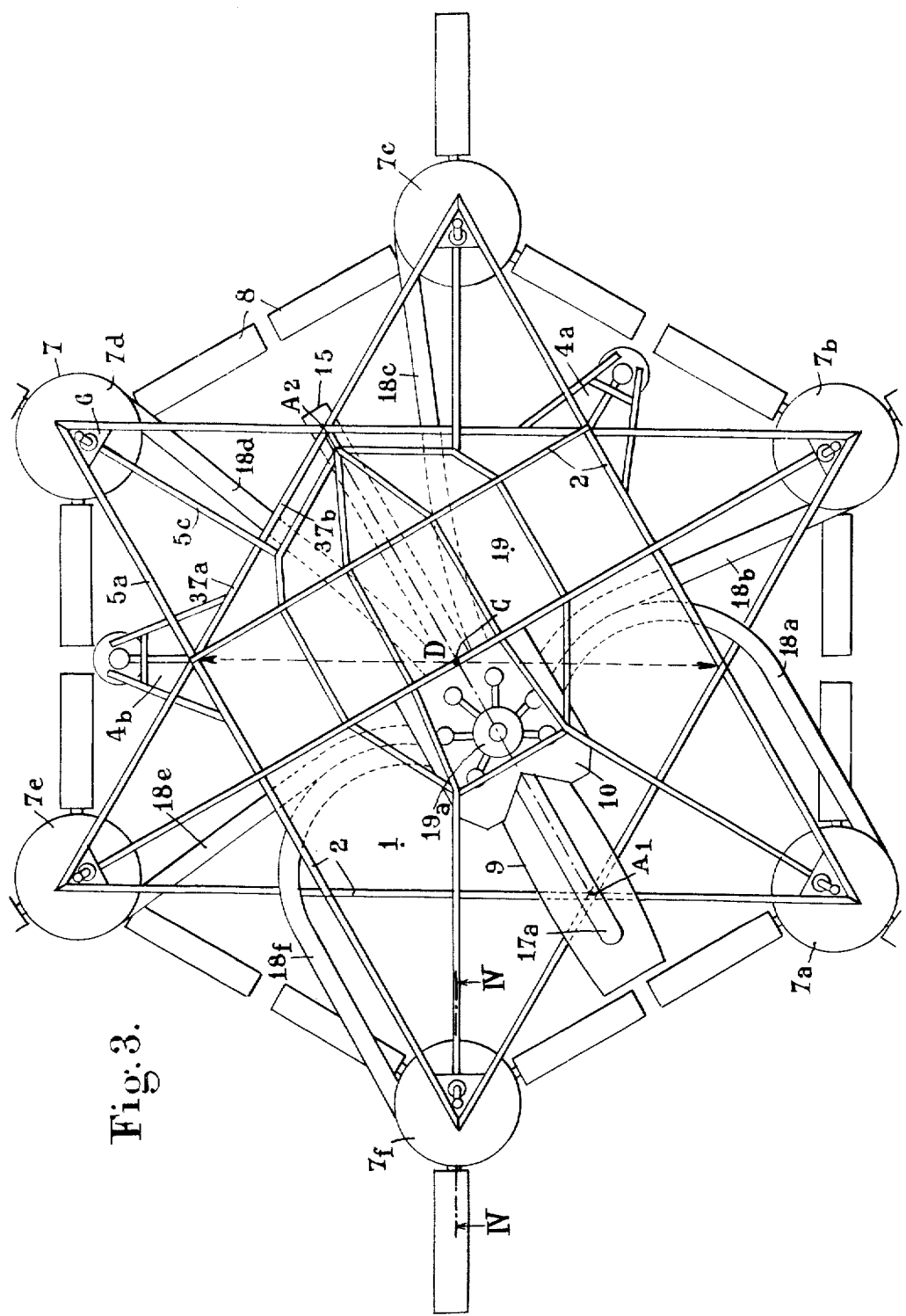

The aircraft illustrated in FIGS. 1 to 3 of the drawings comprises essentially a horizontal platform 1 consisting of tubular frame elements 2 (FIG. 3) welded to one another; in this specific form of embodiment, the platform 1 has a regular polygonal outer peripheral contour consisting of a frame made of tubular welded elements and the transverse rigidity of this frame is obtained by providing three tubular lognitudinal members having their ends welded to the middle points of the opposite sides of the hexagonal frame. This platform 1 is supported by a three-wheeled undercarriage of the heightened or upswept type, with one steerable wheel 3a, and two non-steerable or fixed wheels 3b, 3c mounted by means of suitable and known shock-absorbers to the lower ends of three legs 4a, 4b and 4c, having a tubular trussed structure, the upper ends of said legs 4a, 4b, 4c being welded to properly selected points of the tubular frame elements of said platform 1. This rigid assembly is so disposed that the three wheels of the undercarriage are positioned substantially at the vertices of an equilateral triangle, the length of the sides of this triangle being so selected that the wheelbase of the undercarriage be wider than the major transverse dimension of said platform 1, that is to say, the diameter D of the circle circumscribed to its hexagonal periphery. On the other hand, the steerable wheel 3a lies substantially in the vertical plane containing a predetermined diameter of the hexagonal platform, as shown in dash and dot line in FIG. 3, the ends of this platform diameter being designated by the reference symbols $A_1$ and $A_2$ in FIG. 3.

Figure 4:
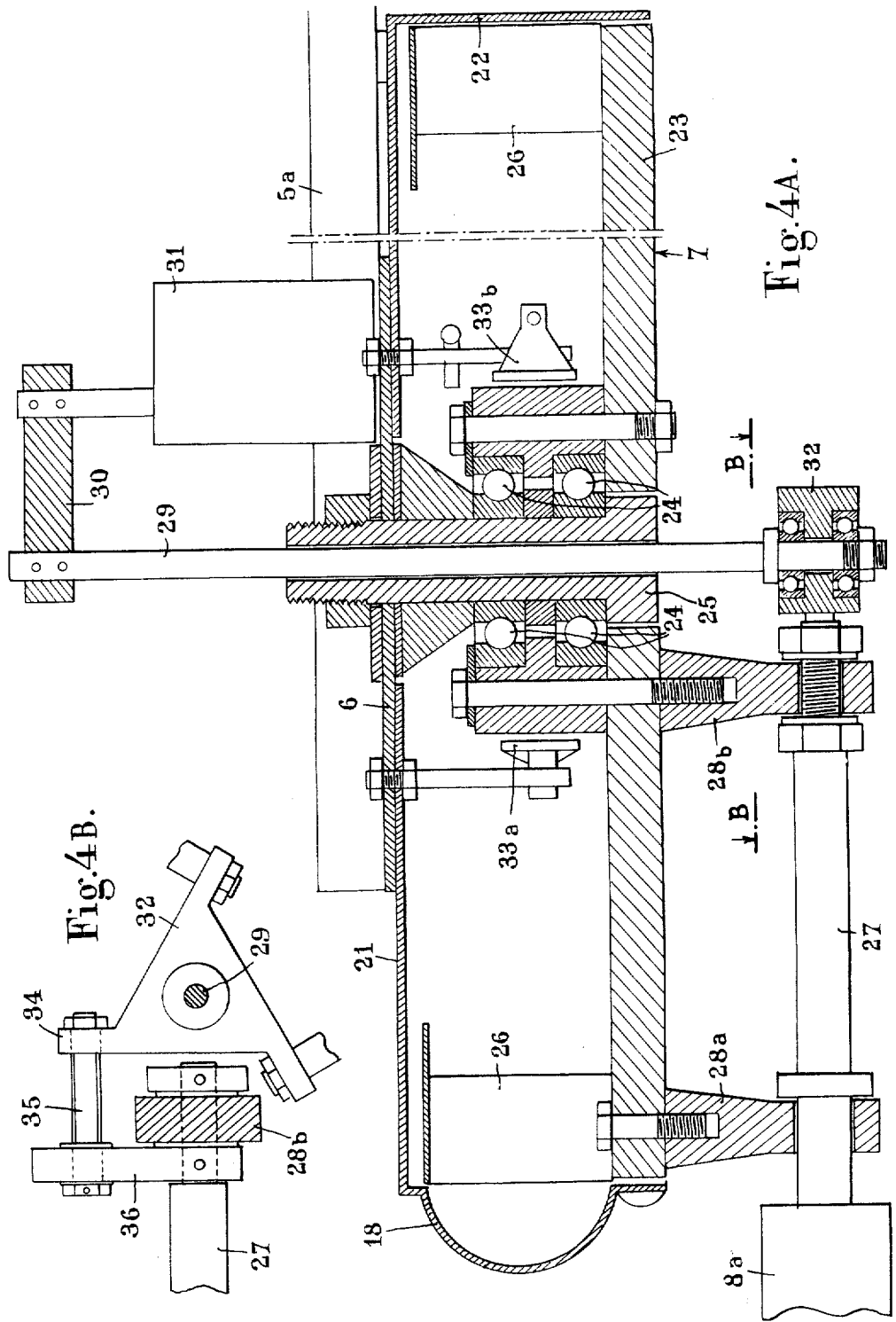
FIG. 4A is a section taken along the line IV—IV of FIG. 3.
FIG. 4B is another section taken along the line B—B of FIG. 4A.

From each one of the six sides forming said hexagonal periphery of platform 1 a radial arm extends outwards to a distance therefrom on the corresponding side of said periphery which is substantially less than D/2; in the embodiment contemplated, each radial arm comprises two tubular members 5a and 5b having first ends welded to a pair of adjacent vertices of the hexagonal frame constituting the periphery of said platform 1; these two tubular elements 5a and 5b welded at their other ends to a common supporting plate 6, for example of triangular configuration, are disposed like this plate 6 in a plane rising slightly towards said supporting plate 6, for example by forming an angle of about 15° in relation to the substantially horizontal plane of the platform 1 (FIG. 2); In this embodiment each radial arm is completed by a third tubular element 5c having one end welded to the node or point of junction of a pair of tubular frame members 37a and 37b overlying the corresponding side of the hexagonal frame of platform 1, to which they are also welded. The casing 8 of a turbine 7 is secured to the lower face of the supporting plate 6 attached the end of each radiala arm such as 5a, 5b, 5c, so that the axis of rotation of this turbine be exactly perpendicular to said supporting plate 6; consequantly, the axes $\alpha$ of the six turbines such as 7, carried by the relevant ends of radial arms such as 5a, 5b and 5c, are slightly inclined to the vertical, for example by 15°, so that they converge as shown by the arrow f of FIG. 2 towards a point located above the centre C (FIG. 3) of the hexagonal platform 1. A main lifting rotor such as 8 is coupled directly to the rotor of each turbine 7 in a manner to be described in detail presently with reference to FIG. 4, whereby said lifting rotor 8 can revolve about the same axis $\alpha$ as the rotor of said turbine 7. In the exemplary form of embodiment illustrated the length of each one of the three blades of each rotor, such as 8, is inferior to the distance measured from its axis $\alpha$ to the nearest side of the hexagonal periphery of platform 1, that is, considerably less than D/2 if, as illustrated in FIG. 3, the tubular elements 5a, 5b of each radial arm lie each in the same vertical plane as an adjacent sitle of said peripheral contour of platform 1.

Figure 5:
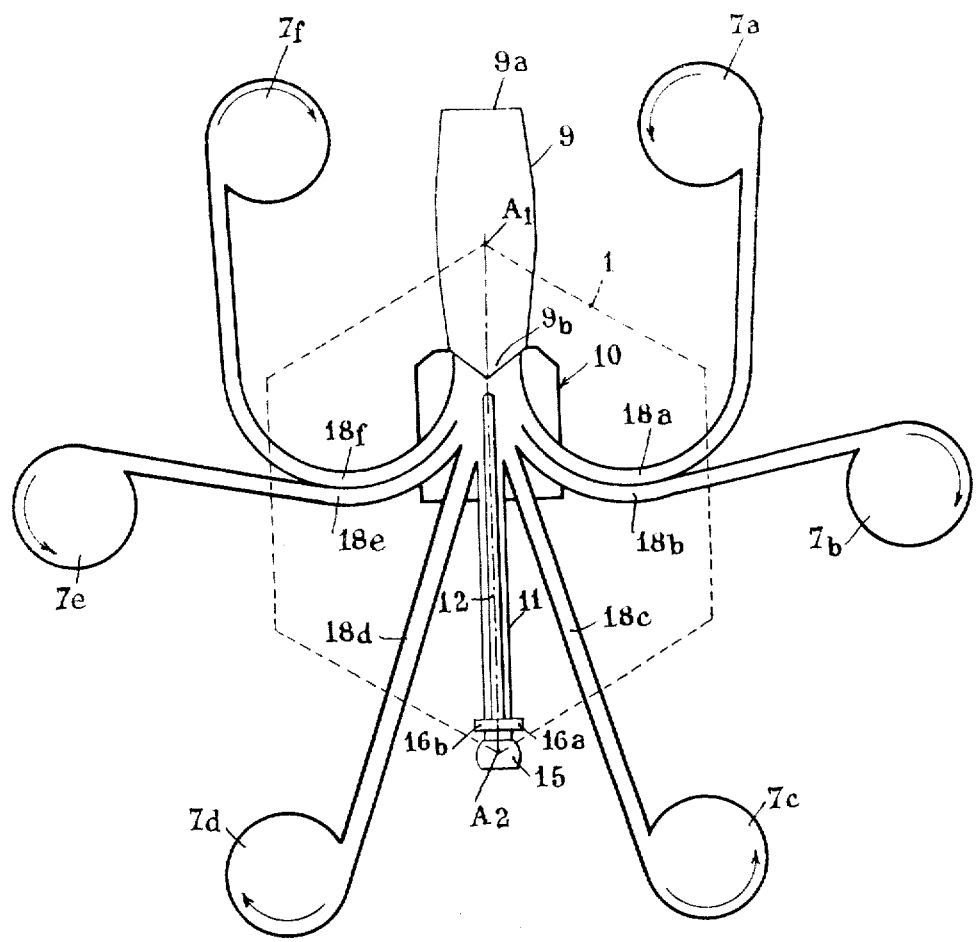
FIG. 5 is a diagram illustrating the structure of the power plant of the aircraft shown in FIGS. 1 to 3.
Figure 6:
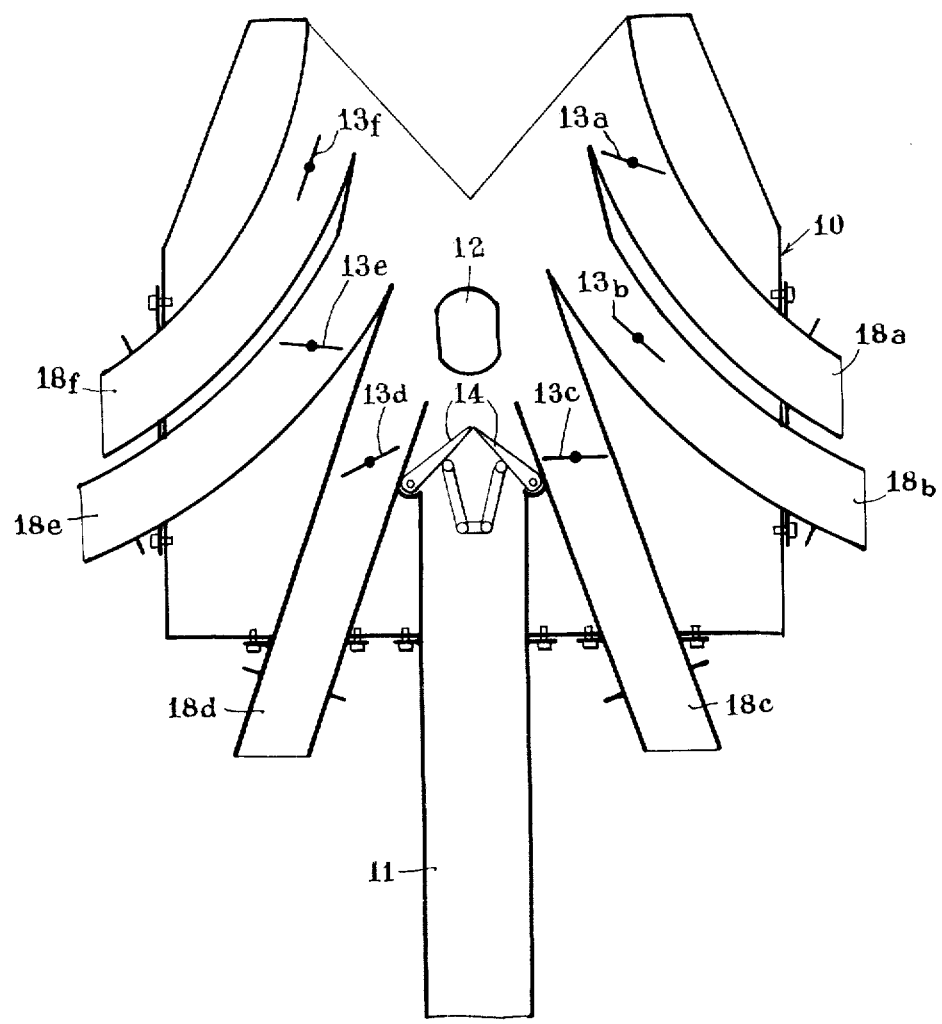
FIG. 6 is a horizontal section showing the gas distributing box illustrated in FIG. 5 and FIGS. 7–9 show details of an auxiliary gas generator arrangement.

The power plant of the aircraft contemplated herein, as illustrated in diagrammatic form in FIG. 5 where the six turbines are denoted 7a to 7f, with the platform 1 designated only by its hexagonaal periphery shown in dash lines, comprises the following component elements:

A jet engine 9 mounted on the upper surface of platform 1, above the vertex $A_1$ of the above-mentioned radius; as illustrated in the drawings, the longitudinal axis of this jet engine 9 lies in the same vertical plane as said diater $A_1 - A_2$ of platform 1, and is slightly inclined to the horizontal plane of the platform, so that the air intake 9a of this jet engine opens well above the platform 1, as shown more particularly in FIGS. 1 and 2. The other end 9b of jet engine 9 is assembled in a fluid-tight manner to one wall of a gas distributing box 10 so that the hot gases expelled from this end of the jet engine penetrate into said box 10 through a suitable inlet opening provided with shutter like control means (not shown in detail) consisting for example of fluid-tight blades, flaps or the like, adapted to be operated from the crew cockpit of the aircraft which will be described presently. The gas distributing box 10 of which the structure is illustrated more in detail in FIG. 6 comprises means for delivering controlled or metered fractions, and possibly zero fraction, of the gases received from the jet engine 9 to conduits 18a to 18f feeding the gas turbines 7a to 7f, respectively, and also to feed conduits 11 and 12. As shown notably in the diagram of FIG. 5, conduit 11 connected to the face of distributing box 10 opposite said jet engine 9, and conduit 12 connected to the bottom face of this box 10, are attached under the aircraft platform 1 substantially along the diameter $A_1 - A_2$ thereof, and the conduits 18a to 18f emerge the ones from the face of the distributing box 10 opposite the jet engine 9 and the others from its side faces, but all these conduits are relatively moderately inclined to the direction of said diameter $A_1 - A_2$ of said platform 1; this arrangement, clearly shown in FIG. 5, is adapted to guide along a regular path the gases issuing from the jet engine 9 and entering the various conduits 18a to 18f, 11 and 12, so as to minimize the losses of kinetic energy of the gas streams which are caused by changes in their direction of flow. FIG. 6, shows diagrammatically, in the form of butterfly valves or shutters denoted 13a to 13f, members for controlling the cross-sectional passage areas of the feed conduits 18a to 18f; since many types of such control members are well known to those conversant with the art, and the present invention is not concerned with any of them, it is not deemed necessary to describe these valve members in detail, the same also applying to the means for controlling these valve members from the pilot's cockpit of the aircraft; for controlling the ingress of jet engine gases into the major conduit 11 the valve means contemplated are shown for the sake of illustration in the form of pivoted blades 14 also adapted to be actuated from the crew cockpit. The inlet or the output of conduit 12 is also provided with means for controlling the conduit cross-sectional passage area, these means being also adapted to be actuated from the cokpit. Besides, conduit 11 is adapted to supply gases from the jet engine 9 to an ejection nozzle 15 for the horizontal propulsion of the aircraft which, in the embodiment illustrated, is mounted beneath the vertex $A_2$ of the hexagonal peripheral contour of the aircraft platform 1; this nozzle 15 is adapted to swivel in the vertical plane, and possibly also in the horizontal plane. The conduit 12 supplies jet engine gases to a pair of turning nozzles 16a and 16b which, in the typical embodiment illustrated, are directed to produce substantially horizontal thrusts perpendicular to said diameter $A_1 - A_2$ of platform 1 and symmetrically in relation to this diameter, that is, in opposite directions. As an alternative, the pair of turning nozzles 16a and 16b may be directed with a view to produce horizontal thrusts but directed at an angle with respect to said diameter $A_1 - A_2$, in order to provide components capable of reinforcing the thrust of the ejection nozzle 15; the pair of turning nozzles 16a and 16b may also be fed through separate conduits, or if desired through suitable branch conduits connected to the conduit 11 feeding the ejection nozzle 15.

Figure 7:
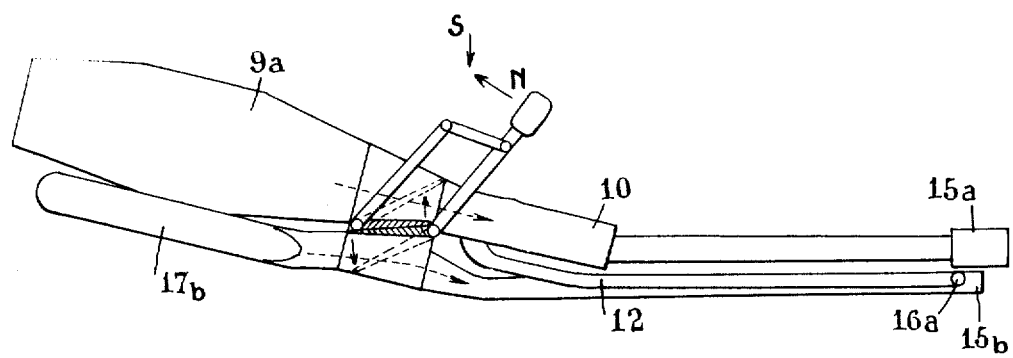
Figure 8:
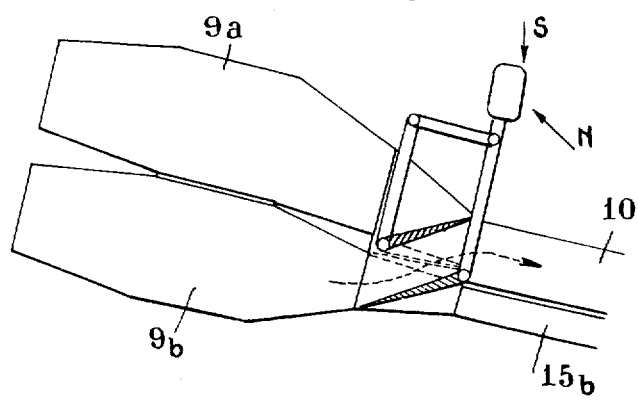
Figure 9:
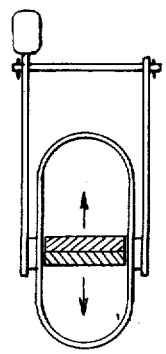

Auxiliary or emergency power gas generators, notably in the form of rockets 17a and 17b (FIGS. 2 and 3) may be provided optionally in order to supply thrust gas to the distributing box 10 in case of failure of the jet engine 9; in the form of embodiment illustrated, these rockets 17a and 17b are mounted, for example detachably, to the casing of jet engine 9, their gas outlets being connected in fluidtight relationship to the edges of suitable openings formed in the wall of distributing box 10 to which the end 9a of jet engine 9 is connected. In case of failure of the main jet engine, adequate means, (N-S), as shown in FIGS. 7-9, are provided for closing shutters from the crew cockpit of the aircraft and thus isolate the jet engine 9 from the distributing box 10, and then igniting the rockets 17a and 17b simultaneously or successively, in order to compensate the deficiency of the supply of hot gases from the jet engine 9 to the distributing box 10.

A cockpit or crew cabin 19 is provided on the upper face of platform 1; in the embodiment contemplated, this cockpit comprises essentially a frame structure of tubular elements welded to the hexagonal frame constituting the outer peripheral contour of said platform 1; this frame has its bays filled by means of rigid panels, of which at least a plurality are made of strong transparent material. Preferably, the crew cabin is arranged in the front portion of this structure, that is, just behind the jet engine 9, and comprises all the control means such as 19a (FIG. 3) necessary for flying the aircraft. Another cabin for transportion goods and/or passengers may be provided beneath said platform 1, between the legs 4a - 4c of the heightened under carriage. At the top of cabin 19 a compartment 20 accessible through a hole provided with a cover and formed in the roof of cabin 19 is provided; this compartment 20 may contain at least one folded parachute having its fixing-lugs anchored to frame elements of said cabin 19, which must of course have a sufficient strength for the purpose; thus, if for any reason the aircraft lift during a flight becomes suddenly insufficient, the parachute or parachutes contained in said compartment 20 may be ejected from the latter after opening the cover normally closing its access hole, these operations being controlled either by the pilot from the crew cockpit or by automatic means. If no cabin is provided beneath the platform 1 the fuel tanks are mounted preferably at this location in order to lower the centre of gravity of the aircraft according to this invention. Access to the cabin 19 may be had for example through a pair of hinged panels mounted in the floor of platform 1, one panel comprising a light-weight, folding ladder, the other panel constituting for example a jumping hole or an emergency exit.

FIG. 4A illustrates constructional details of a rotor 8 (of which a single blade 8a is partially visible) and its driving turbine 7. The turbine casing consists essentially of a circular plate 21 of a diameter corresponding substantially to about one-third of that of said rotor 8, the central portion of this plate being secured through any suitable means to the supporting plate 6; this circular plate 21 caries at its outer periphery a depending cylindrical skirt 22 opening downwards. The turbine rotor is mounted for free rotation, coaxially to and within the skirt 22. In the form of embodiment contemplated this rotor comprises essentially a relatively thick annular plate 23 closing substantially the lower, open end of said skirt 22, this plate 23 being rotatably mounted by means of ball-bearings 24 on a tubular socket 25 of which the upper end extends through the aforesaid plates 21 and 6 to which it is connected. The thick annular plate 23 of the rotor carries on the other hand along its outer periphery and within the skirt 22 a series of blades 26 disposed radially in the vicinity of the fixed cylindrical skirt 22, as shown; in the left-hand portion of FIG. 4A the reference numeral 18 designates one of the side walls of the conduit 18 supplying driving gas in a tangential direction to the casing 21, 22 of turbine 7, as also shown in FIG. 5. Each rotor blade such as 8a comprises at its inner end a shaft 27 which, in the embodiment shown in FIG. 4A, is supported beneath one radius of the lower, thick plate 23 of the turbine structure, by means of brackets 28a and 28b in which said shaft 27 can pivot freely. The socket 25 receives therethrough a rod 29 adapted to slide freely therein, the upper end of this rod 29 being connected to a control arm 30 actuated by means of a driving cylinder 31 of any suitable and preferably electrical type and the lower end of said rod 29 is coupled to a member controlling the pivotal movements of shaft 27 and also the shafts of the other rotors through a ball-bearing spider 32. Preferably, the cylinder 31 is of the progressive action type, so that each vertical position of rod 29 corresponds to a well-defined angular setting of the shaft 27 of blade 8a, and therefore a well-defined pitch value of the corresponding rotor. The movement of translation of the ball-bearing spider 32, which is locked in the axial direction to the lower end of said sliding rod 29 is converted into a pivotal movement of each rotor blade shaft 27 through any well-known mechanical means, a typical embodiment of which is clearly shown in FIG. 4B. In FIG. 4B, it will be seen that the ball bearing-spider 32 has a polygonal configuration, notably a triangular configuration in the case of a three-bladed rotor, and that it comprises at each vertex a lug such as 34, coupled through a pivot member 35 to one end of a link 36, having its other end rigid with the blade shaft 27. With this arrangement it is clear that the vertical movements (FIG. 4A) of rod 29 and ball-bearing spider 32 are transformed by said pivot member 35 into angular movements of the link 36 and of the shaft 27, and also of the shafts (not shown) of the other rotor blades.

As an alternative, the ball-bearing spider 32 may be rotatably solid with the sliding rod 29 and in this case suitable rolling-contact bearings are interposed between this rod 29 and, on the one hand, said socket 25 and on the other hand the corresponding end of arm 30. In FIG. 4A, the reference numerals 33a and 33b designate a pair of brake shoes adapted, under the pilot's control from the cockpit, to hold against rotation the rotor 7 of the corresponding turbine and the lifting rotor coupled thereto, when the aircraft is retained on the ground.

To take off, after pre-setting the various control members 13a to 13f to compensate the differences between the respective speeds of the air flows directed to the various turbines, the shutters or blades 14 (FIG. 6) being closed and the conduits 18a to 18f open, with the various rotors 8 free to rotate with feathered blades, the pilot starts the jet engine 9 and sets its thrust at a value sufficient to enable the rotors 8 to provide the necessary lifting force when the pitch of all these rotors 8 is gradually increased by means of a single level controlling all the cylinders 31 (FIG. 4A). Then the aircraft trim is controlled by modifying the cross-sectional areas of turbine feed conduits 18a to 18f, with the assistance of control member 19a (FIG. 3) acting upon the shutters 13a to 13f in order progressively to reduce the air output delivered to the turbine or turbines producing a lifting rate higher than the others. Thus, a vertical take-off is obtained, while keeping the shutters 14 closed, to prevent the feeding of propulsion nozzle 15. Under these conditions, the noise level remains relatively low, due to the large diffusion of hot air from the turbine outlets. The aircraft can subsequently be flown horizontally by properly actuating the control shutters or like members 13a to 13f so that the resultant of the forces transmitted to the rotors 8 keeps the aircraft at a constant altitude while producing a horizontal thrust or fly. The machine may also be flown horizontally by gradually opening the shutters 14 and, when a sufficient horizontal or level speed has been attained, due to the action of the propulsion nozzle 15, the pilot may gradually reclose the inlets of feed conduits 18a to 18f leading to the turbines 7a to 7f by actuating the control members 13a to 13f provided for this purpose, so as to reduce the gas feed to said turbines; the lifting rotors such as 8 keep rotating bodily with the rotors of the corresponding turbines in order to provide the necessary lifting force, the horizontal flight thrust being provided by the propulsion nozzle 15. When flying level, the machine can be turned left or right either by means of the nozzles 16a and 16b, of which the feed control members are also actuated from the crew cockpit, or by changing the aircraft trim; in this last instance, any desired change of direction is obtained by modifying either the thrust of at least some of the turbines 7a to 7f disposed on the same side of the above-defined diameter $A_1 - A_2$, with the assistance of the corresponding control members 13a to 13f, or the pitch of the lifting rotors driven by, or coupled to, these turbines. To this end, separate controls are provided in the crew cabin for actuating the shutters or like members 13a to 13f and the various cylinders such as 31 (FIG. 4A). A vertical landing is obtained by closing the shutters 14, restoring the aircraft trim by means of control members 13a to 13f, and gradually reducing the jet engine thrust.

It will readily occur to those skilled in the art that many improvements and changes may be brought to the above-described typical embodiment of the present invention without departing from the basic principles thereof; a few modifications within these principles are suggested hereinafter by way of example, not of limitation Thus, the aircraft according to this invention may comprise any even number 2n of lifting rotors, with a minimum of four; the platform 1 may, as in the above-described typical embodiment, have a regular polygonal contour with 2n sides, or a circular configuration, without excluding an elongated shape having a symmetry axis. In all cases, each one of said 2n rotors must have a diameter considerably smaller than the width or diameter of said platform; the number of blades of each rotor is a matter of choice, this also applying to the technical design of the pitch control means associated with these rotors. In the case of a polygonal or circular platform the $2n$ rotors are shifted angularly by $180°/n$ so as to be disposed symmetrically in relation to the centre of said platform, the rotors of each symmetrical pair rotating in opposite directions, as shown by the arrows of FIG. 5 denoting at the same time the direction of the gas flow in turbines $7a$ to $7f$ and the direction of rotation of their rotors. Instead of being carried by radial cantilever arms projecting from the outer periphery of the platform 1, the lifting rotors, and possibly also their driving turbines, may be mounted directly to the outer periphery of said platform, whatever its configuration; under these conditions, the lifting rotors may be located indifferently above or below the platform, or fitted within the thickness of this platform. All these arrangements would permit of driving all the lifting rotors from a single and common turbine by using mechanical transmission means also carried by the platform; however, this last-mentioned arrangement would display the inconvenience already explained in the preamble of this specification with reference to mechanical-transmission helicopters.

Instead of providing a single jet engine from which the hot gases are distributed by means of box 10 on the one hand to the main propulsion nozzle 15 and on the other hand to the various turbines $7a$ to $7f$ driving the lifting rotors, the aircraft according to the present invention may be equipped with two jet engines, intended the one more particularly for feeding the propulsion nozzle 15 and the other for feeding the lifting rotor driving turbines; however, in this case, it is advantageous to cause both jet engines to deliver their gases to a single and same distributing box 10 supplying in turn the set of conduits $18a$ to $18f$, 11 and 12, as illustrated in FIG. 5, for with this arrangement and in case of failure of one jet engine all the aircraft propulsion and lifting means can be supplied without any interruption.

The embodiment of the driving turbine associated with each lifting rotor, which is illustrated in FIGS. 4A and 4B is particularly advantageous from the specific point of view of the problems arising from the icing of the lift rotor blades; in fact, these blades are constantly heated to a relatively high temperature, due to the proximity of, and their mechanical coupling with, the turbine rotors driven by the hot gases from the jet engine; a still more efficient de-icing effect could easily be obtained by diverting one fraction of the hot gases flowing in the turbine casing towards small nozzles carried by this casing or by the turbine rotor, and directed towards said blades.

The steerable wheel $3a$ (FIG. 1) of the undercarriage may be steered from the crew cabin. The height of each one of the three legs of this threewheeled undercarriage may be made adjustable by simply incorporating in each leg a ram controlled from the pilot's cabin so that the aircraft can be landed on a bushy or even sloping ground. If desired, the undercarriage wheels may be made retractable or replaced by or associated with fixed cupulae and/or floats. Automatic-inflation floats may also be disposed all around the aircraft platform.

Disposing the lifting rotors substantially level with the aircraft platform in the machine according to this invention, as illustrated in the drawings, is particularly advantageous in that the occupants of the upper cabin or cockpit (and also those of the lower cabin, if provided) have a very good visibility, a feature particularly valuable in military versions of this aircraft.

The lownoise level characterising this aircraft when its jet engine nozzle 15 is inoperative, that is, mainly when taking off and landing, permits of contemplating its use in urban districts where it constitutes a particularly rapid and efficient means of transport suitable for all civilian and military applications.

What is claimed as new is:

1. A multi-rotor helicopter comprising a platform of polygonal configuration having $2n$ sides and at least one median axis, a propelling jet-engine for horizontal flight, disposed along said platform median axis, a number $n$ of pairs of short-bladed lift rotors having a diameter smaller than that of said platform, the two rotors of each pair rotating in opposite directions and being disposed symmetrically in relation to the axis of said platform along the periphery thereof, with a relative angular shift of $180°/n$, the axes of each pair of rotors converging to a point located above the median axis of said platform and the centre thereof, $n$ pairs of gas turbines mounted adjacent the periphery of said platform, and having corresponding rotors coupled coaxially to said $2n$ lift rotors, means for producing propelling gases and means for distributing in a controlled manner said propelling gases to said turbines.

2. Helicopter as set forth in claim 1, further comprising a pair of turning-thrust nozzles adapted to produce substantially horizontal thrusts in corresponding directions across said platform median axis, said nozzles being arranged symmetrically to one another in relation to said axis, and means for distributing in a controlled manner one fraction of the propelling gases produced by said propelling jet-engine to said turning-thrust nozzles.

3. Helicopter as set forth in claim 1, wherein said propelling jet-engine comprises an ejection nozzle adapted to pivot in at least one of two planes, namely a vertical plane and a horizontal plane.

4. Helicopter as set forth in claim 1, wherein each rotor of each lift rotor has a shaft pivotally mounted to the rotor of the corresponding turbine, externally thereof, said shaft extending parallel to one radius of said turbine rotor, means being also provided for pivoting simultaneously all the blades of said lift rotor.

5. Helicopter as set forth in claim 1, wherein the rotor of each turbine comprises a hollow shaft, means for pivoting simultaneously all the blades of the corresponding lift rotor comprising a rod having an intermediate portion slidably engaging said hollow shaft of said turbine rotor, a first end of said rod extending in close vicinity of the ends of the shafts of the various blades of said lift rotor, a bearing in which said first end of said rod is rotatably engaged, means acting upon the other end of said rod for controlling the sliding movements thereof in said hollow shaft of said turbine rotor, and coupling means for converting the motion imparted to said bearing by said sliding rod into pivoting movements of the shafts of all the blades of said lift rotor.

6. Helicopter as set forth in claim 1, comprising in additon a gas distributing box disposed along the median axis of said platform, in alignment with a jet-engine and said propelling nozzle, an outlet of said box connected to said propelling nozzle, and feed conduits extending in directions moderately inclined to the propelling nozzle and inserted between the other outlets of said distributing box and the corresponding turbines.

7. Helicopter as set forth in claim 1, wherein said lift rotors and the corresponding turbines are carried by radial arms respectively which extend from said platform to a distance from the upper periphery thereof which is greater than the radius of said lift rotors.

8. Helicopter as set forth in claim 1, further comprising three legs of relatively substantial height having their upper ends secured to the lower face of said platform, the first leg being located beneath the median axis of said platform and the other two legs being disposed on either of said median axis, with their lower ends spread apart by a distance substantially greater than the transverse dimension of said platform, and a three-wheel landing gear comprising a first steerable wheel mounted at the lower end of said first leg, the two other non-swivelling wheels being mounted at the lower ends of the two other legs.

9. Helicopter as set forth in claim 1, further comprising an auxiliary generator and switching means whereby said auxiliary generator can operate as a substitute for the main generator in case of emergency such as a failure of said main generator.

* * * * *